US005661649A

United States Patent [19]
Carson et al.

[11] Patent Number: 5,661,649
[45] Date of Patent: Aug. 26, 1997

[54] AIRBORNE GRAVITY AND MAGNETIC FIELD SURVEYING METHOD

[75] Inventors: Franklin D. Carson, Hilltown; William R. Gumert, East Rockhill, both of Pa.

[73] Assignee: Carson Services, Inc., Perkasie, Pa.

[21] Appl. No.: 363,970

[22] Filed: Dec. 23, 1994

Related U.S. Application Data

[63] Continuation of Ser. No. 751,096, Aug. 28, 1991, abandoned, which is a continuation-in-part of Ser. No. 410,871, Sep. 22, 1989, abandoned, which is a continuation-in-part of Ser. No. 723,262, Apr. 15, 1985, abandoned, which is a continuation-in-part of Ser. No. 528,397, Sep. 1, 1993, abandoned, which is a continuation-in-part of Ser. No. 309,906, Oct. 9, 1981, Pat. No. 4,435,981.

[51] Int. Cl.$^6$ ........................................... G06F 19/00
[52] U.S. Cl. ................................................... 364/420
[58] Field of Search ........................... 324/330, 331; 73/382 R, 382 G; 364/420, 424.02, 432, 433, 463

[56] References Cited

U.S. PATENT DOCUMENTS

| | | |
|---|---|---|
| 2,293,437 | 8/1942 | LaCoste. |
| 2,377,889 | 6/1945 | LaCoste. |
| 2,610,226 | 9/1952 | Klaasse ................... 324/331 |
| 2,611,802 | 9/1952 | Jensen. |
| 2,611,803 | 9/1952 | Rumbaugh. |
| 2,626,525 | 1/1953 | Heiland. |
| 2,674,887 | 4/1954 | Worden. |
| 2,856,772 | 10/1958 | Strihafka ................... 73/504 X |
| 2,964,948 | 12/1960 | LaCoste. |
| 2,977,799 | 4/1961 | LaCoste. |
| 3,011,347 | 12/1961 | Boitnott. |
| 3,019,655 | 2/1962 | Graf. |
| 3,023,359 | 2/1962 | Jenny ................... 324/331 |
| 3,033,037 | 5/1962 | Emmerich. |
| 3,038,338 | 6/1962 | Boitnott. |
| 3,062,051 | 11/1962 | Slater. |
| 3,180,151 | 4/1965 | Gustafsson. |
| 3,194,075 | 7/1965 | Hodge. |
| 3,211,003 | 10/1965 | Worden. |
| 3,242,736 | 3/1966 | Winter ................... 73/382 X |
| 3,447,293 | 6/1969 | Townsend. |
| 3,474,672 | 10/1969 | LaCoste ................... 73/382 R |
| 3,495,460 | 2/1970 | Ward. |
| 3,501,958 | 3/1970 | Kuzivanov. |
| 3,546,943 | 12/1970 | Wing. |
| 3,583,225 | 6/1971 | Wing. |
| 3,604,660 | 9/1971 | Marley ................... 324/331 X |
| 3,621,718 | 11/1971 | Ireland ................... 73/386 X |
| 3,960,344 | 6/1976 | Dugan ................... 324/330 |
| 4,163,387 | 8/1979 | Schroeder ................... 364/433 X |
| 4,168,524 | 9/1979 | Soltz et al. ................... 364/454 X |
| 4,197,737 | 4/1980 | Pittman ................... 73/178 R |
| 4,359,733 | 11/1982 | O'Neill ................... 343/6.5 LC |
| 4,435,981 | 3/1984 | Carson et al. ................... 324/331 |
| 4,550,601 | 11/1985 | Evans ................... 73/382 R |

FOREIGN PATENT DOCUMENTS

| | | |
|---|---|---|
| 625063 | 8/1961 | Canada. |
| 652757 | 11/1962 | Canada. |

OTHER PUBLICATIONS

*Navigation*, vol. 26, No. 1, 1979, Morgan, "The Role of Navigation Satellites . . . ", pp. 37–43.
*Geophysics*, vol. 5, No. 4, 1967, Lacoste, "Gravity Measurements at Sea and in the Air", pp. 520–524.
Carson Geoscience: Airborne Gravity Surveying, Mar. 1981, pp. 1-1 to 8.2.

*Primary Examiner*—Gail O. Hayes
*Attorney, Agent, or Firm*—Woodcock Washburn Kurtz Mackiewicz & Norris LLP

[57] ABSTRACT

A method is disclosed for airborne gravity and magnetic field surveying, in which the airborne vehicle is stabilized with respect to speed, direction of heading, and center of gravity, and in which the gravity meter is of adequate sensitivity and provides signals that are recorded at a high sample rate on a magnetic tape, with magnetic data collected and preserved which can be used alone or as a reference for checking the accuracy of the gravity data, and with the aircraft's position computed using a satellite positioning system, or a multi-range navigation system that is geodetically located.

30 Claims, 2 Drawing Sheets

AIRBORNE GRAVITY AND MAGNETIC FIELD SURVEYING METHOD

CROSS REFERENCE TO RELATED APPLICATIONS

This is a continuation of application Ser. No. 07/751,096, filed Aug. 28, 1991, abandoned, which is a continuation-in-part of Ser. No. 07/410,871 filed Sep. 22, 1989 (abandoned); which is a continuation-in-part of Ser. No. 06/723,262 filed Apr. 15, 1985 (abandoned); which is a continuation-in-part of Ser. No. 06/528,397 filed Sep. 1, 1983 (abandoned); which is a continuation-in-part of Ser. No. 06/309,906 filed Oct. 9, 1981, now U.S. Pat. No. 4,435,981.

BACKGROUND OF THE INVENTION

1. Field of the Invention

This invention relates to a method for airborne gravity and magnetic field surveying with which greater accuracy of data collection and processing is obtained than has heretofore been available.

2. Brief Description of the Prior Art

It has been proposed to use airborne vehicles for gravity surveying as pointed out in Reviews of Geophysis, Vol. 5, No. 4, November, 1967, pages 447 to 526, published by The American Geophysical Union of 2000 Florida Avenue, N.W., Washington, DC 20009 commencing at page 520 to 524 for fixed wing airborne vehicles.

A review of airborne gravity surveying activities with respect to helicopters can be found in "Airborne Gravity Surveying, Technical Information", published March, 1981, by Carson Geoscience, Perkasie, Pa. This publication was authored by Franklin D. Carson and William R. Gummert, the inventors herein and describes prior attempts for surveying and the inventors efforts.

Various patents have been issued which set forth apparatus for gravity surveying.

Boitnott in U.S. Pat. Nos. 3,011,347 and 3,308,338; Gustafsson U.S. Pat. No. 3,180,151; and Brede U.S. Pat. No. 3,447,293; and Hutchins Canadian Patent No. 652,757 disclose instruments for measuring gravity or derivatives of gravity of the earth's gravity field, but do not disclose practical systems for accurate airborne surveying.

LaCoste U.S. Pat. Nos. 2,293,437; 2,377,889; 2,964,948; 2,977,799; 3,474,672; Heiland U.S. Pat. No. 2,626,525; Worden U.S. Pat. Nos. 2,674,887 and 3,211,003; Graf U.S. Pat. No. 3,019,655; Ememrich U.S. Pat. No. 3,033,037; Slater U.S. Pat. No. 3,062,051; Hodge et al U.S. Pat. No. 3,194,075; Ward, U.S. Pat. No. 3,495,460; Kuzivanov et al U.S. Pat. No. 3,501,958; Wing U.S. Pat. Nos. 3,546,943 and 3,583,225, show navigation and/or gravity meters but do not show practical systems for accurate airborne surveying.

Klasse et al. U.S. Pat. No. 2,610,226; Jensen U.S. Pat. No. 2,611,802; Rumbaugh et al. U.S. Pat. No. 2,611,803; and Pittman U.S. Pat. No. 4,197,737 show method and/or apparatus for conducting surveys for geophysical or magnetic explorations but do not discuss or treat airborne gravity surveying.

O'Neill U.S. Pat. No. 4,359,733 describes a satellite system which provides signals whereby the position of an aircraft can be established. However, there is no suggestion in O'Neill of controlling the aircraft's flight by means of the satellite signals.

Airborne surveying, and particularly airborne gravity measurement requires a very high degree of accuracy as small variations in data are highly significant to indicate the presence or absence of oil and gas deposits.

The Carson Geoscience article which was authored by Franklin Carson and William Gummert the inventors herein describes the prior art equipment and method of airborne surveying used by others.

As described in the article PP 2-16-2-18 Entech was a company owned by the co-inventor William Gummert and preliminary work was done by him to investigate the feasability of using airborne gravity surveying to develop data which could be used to construct a map of the geological characteristics of an area of survey. While the Gummert-Entech experiments of 1970-1971 disclosed that airborne gravity surveying was feasible, it was not possible to achieve the stability of the aircraft required to produce accurate data. In addition the aircraft could not be flown on preplotted lines because the necessary equipment was not available. Accordingly, the data collected was not of sufficient accuracy to provide an accurate map. The article on Page 2-18-2-20 describes the early Carson attempts to demonstrate the feasibility of airborne surveying in comparison with a land based system, which produced values known to be accurate and with which the airborne data could be compared. While data was obtained that could be used to map an area of survey, the apparatus and equipment were further refined and developed to its present state where it is now possible to obtain data that is accurate enough to be commercially successful.

The proposals heretofore made for airborne surveying do not provide adequate stabilization of the aircraft with respect to speed, do not provide for level flight, do not provide accurate navigation and steering, and do not with other requirements for accurate surveying, measure the gravity or magnetic field, and have other shortcomings.

SUMMARY OF THE INVENTION

In accordance with the invention an improved method is provided for airborne surveying in which an airborne vehicle is stabilized with respect to speed, direction of heading and altitude, the center of gravity is stabilized and maintained during flight, and the aircraft operation is controlled manually, or by an auto-pilot. A gravity meter of adequate sensitivity is used that provides signals that are recorded at a high sample rate on magnetic tape, and the aircraft position is computed using a multi-range navigation system, or by a satellite positioning system.

It is the principal object of the invention to provide an improved method for airborne surveying with which greater accuracy of computed and recorded data is obtained.

It is a further object of the invention to provide an improved method for airborne surveying in which the airborne vehicle is maintained at a selected elevation, the center of gravity is stabilized and the aircraft is further stabilized as to speed and direction.

It is a further object of the invention to provide an improved method for airborne surveying in which the gravity meter is controlled as to its sampling, and specifically the sampling rate.

It is a further object of the invention to provide an improved method for airborne surveying in which the position of the airborne vehicle is precisely known at all times.

It is a further object of the invention to provide an improved method for airborne surveying in which the instruments are located and carried by the airborne vehicle at a stable temperature and preferably in a clean environment.

It is a further object of the invention to provide an improved method for airborne surveying in which the fuel system is modified to provide a constant center of gravity in the airborne vehicle.

It is a further object of the invention to provide an improved method for airborne surveying in which a probe is located on the airborne vehicle in such a manner as to obtain accurate measurement of the static air pressure.

It is a further object of the invention to provide an improved method for airborne surveying wherein accurate measurement of the distance of the airborne vehicle from the ground is obtained.

It is a further object of the invention to provide an improved method for airborne surveying wherein the gravity meter is constructed so that it operates more efficiently in the airborne environment.

It is a further object of the invention to provide an improved method for airborne surveying which provides a magnetic digital recording system with a high degree of sensitivity, variable sampling rate, and a capability of reading the magnetic tape in flight after data has been recorded thereon.

It is a further object of the invention to provide an improved method for airborne surveying which records multiple ranges on a magnetic tape from an electronic navigation system for enhancement of the position accuracy.

It is a further object of the invention to provide an improved method for airborne surveying wherein the operation of the aircraft is controlled by an auto-pilot.

It s a further object of the invention to provide an improved method for airborne surveying wherein the vehicle is guided by signals received from a global satellite system, which can be linked to an auto-pilot for controlling the vehicles operation.

It is a further object of the invention to provide an improved method for airborne surveying which describes the method of data collection, to provide the necessary parameters for computing accurate gravity measurement.

It is a further object of the invention to provide an improved method for airborne surveying wherein simultaneous recording of magnetic and gravity data is obtained.

It is a further object of the invention to provide an improved method for airborne surveying which describes the method of preplotting the required flight path, and which requires the airborne vehicle to comply with such preplotted flight path.

It is a further object of the invention to provide a method for airborne surveying which provides for a grid pattern of lines to be flown, which covers the gravity anomaly of the area to be surveyed.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Figure 1:
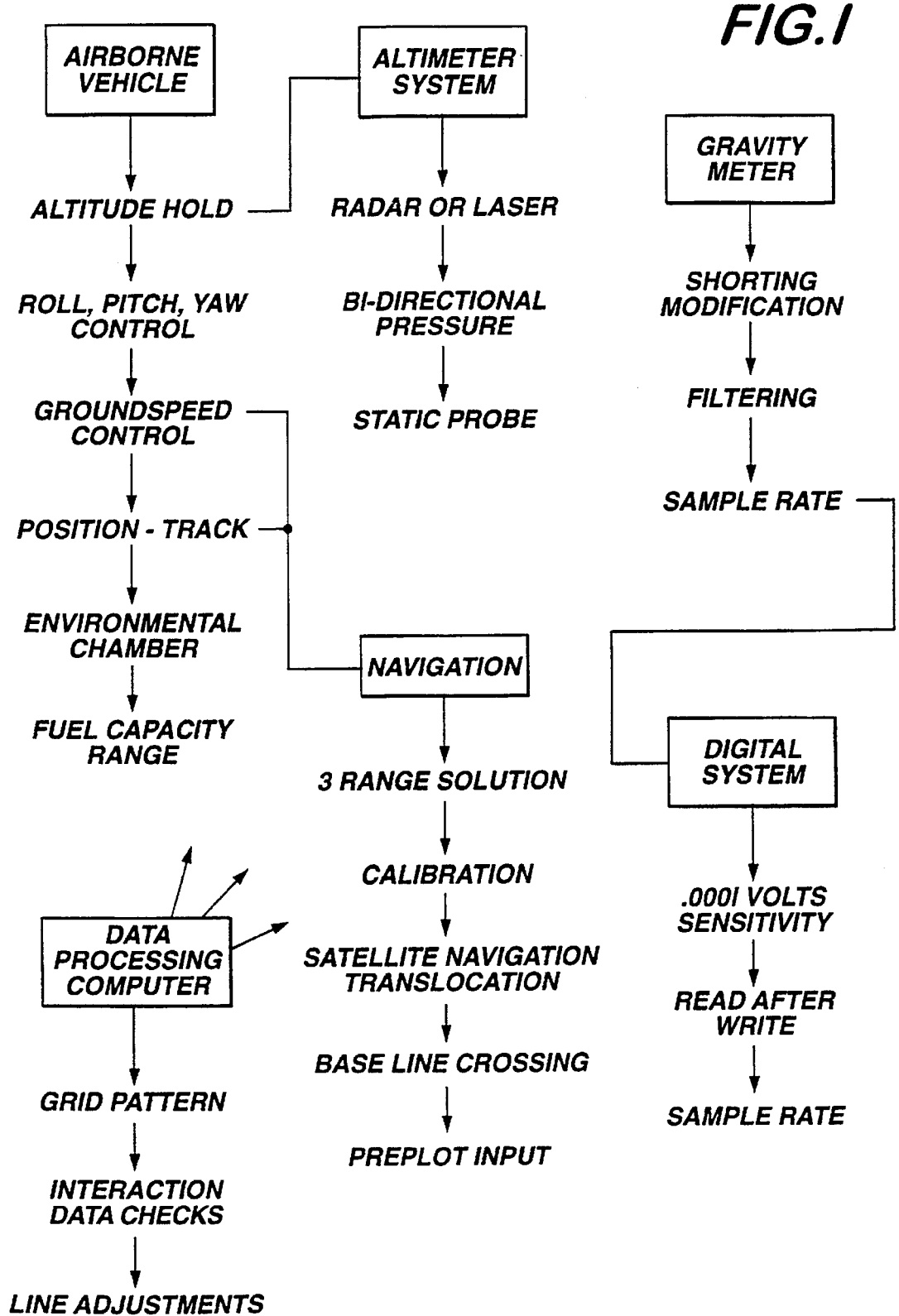
FIG. 1 is a block diagram for purposes of understanding the invention.
Figure 2:
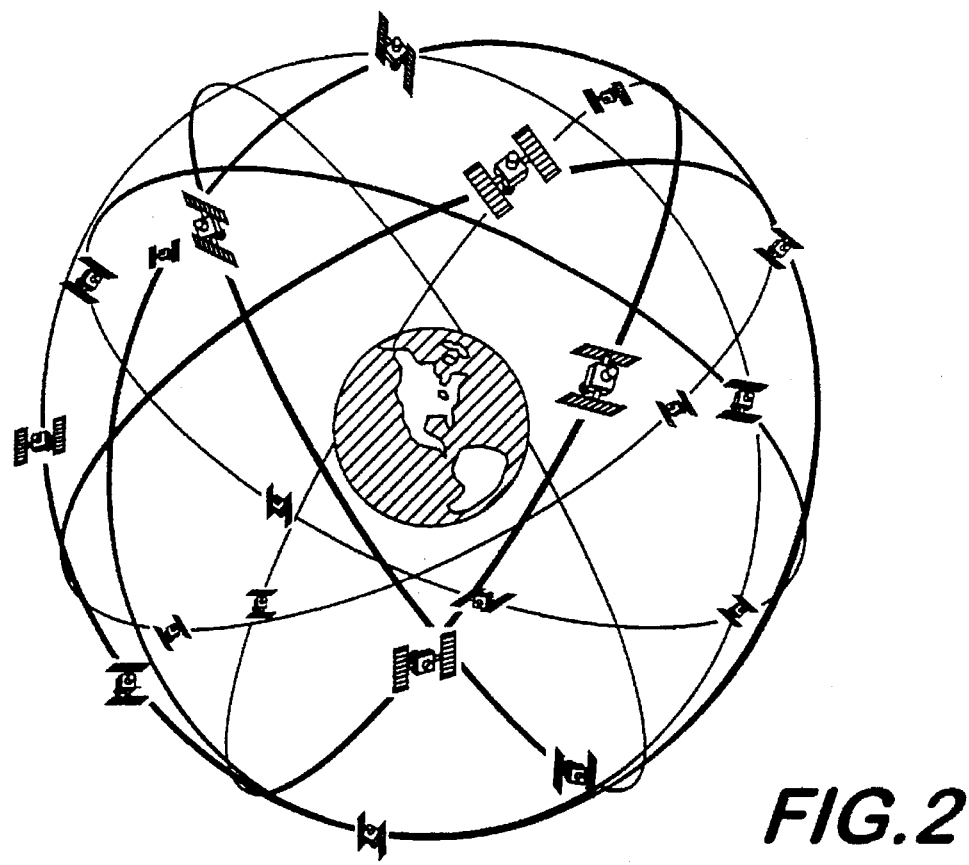
FIG. 2 is a pictorial view of a satellite system used with the method of the invention.
Figure 3:
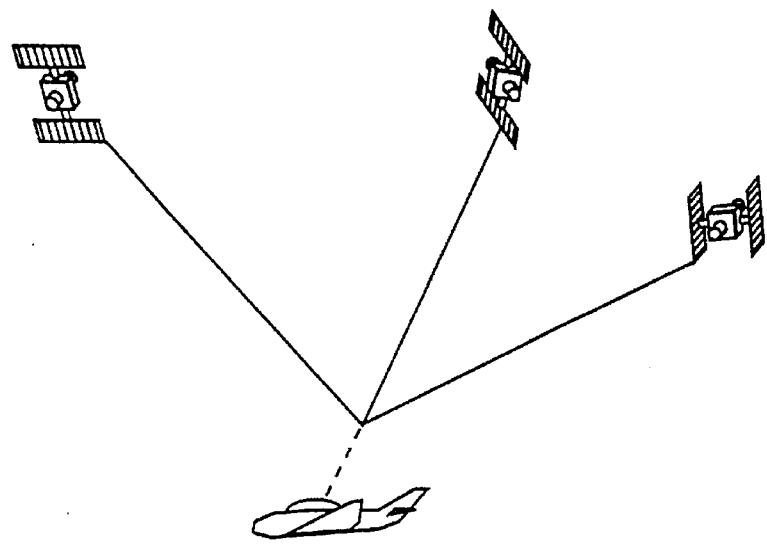
FIG. 3 is a pictorial view illustrating an airborne vehicle and a portion of the satellites of the system of FIG. 2.

Referring now more particularly to FIGS. 1 to 3 of the drawings, any suitable airborne vehicle may be employed including fixed wing aircraft, lighter than air aircraft, and helicopters.

If a helicopter is employed one suitable helicopter is a Sikorsky model 61, which is preferably equipped with internal fuel tanks of a capacity of up to about 8 hours of flight.

The fuel system is further modified by the installation of a central longitudinal fuel tank (not shown) with pumps and lines (not shown) extending to the normal fore and aft and or auxiliary tanks (not shown). The fuel for operation of the helicopter or other airborne vehicle power plant (not shown), is drawn for use from the center fuel tank (not shown) only and the fuel in the other tanks (not shown) is transferred to the center tank (not shown) with the transfer controlled so as to maintain a constant location of the center of gravity of the airborne vehicle.

Helicopters provide the most stable flight platform, and if the Sikorsky helicopter is used, it is preferably provided with a uniquely tuned automatic flight control system that uses collective lift to control the vertical movement of the vehicle during flight without changing the pitch.

For any airborne vehicle it is essential that it have a flight control system that controls the vertical movement of the vehicle during flight and preferably to limit the elevation to ±10 feet or less in thirty seconds of time, from a selected predetermined elevation.

Reduction of the vertical elevation variations from a predetermined elevation during flight is particularly important, as oil and gas deposits are difficult to locate, the gravity changes measured are small, and affected by the vertical distance from the terrain being surveyed, which can greatly affect the accuracy of the data.

In order to achieve the desired stability of airborne vehicle during flight it may be necessary to fly the airborne vehicle by using an auto pilot, in order to obtain accurate data. The auto-pilot must be modified in order to achieve the desired results.

The modification to the auto pilot requires that it be calibrated to increase its response sensitivity and response time, which is consistent with the necessity to obtain optimum performance and accurate data from all instruments. The auto pilot is checked and adjusted to get the maximum performance available from the design, using the other available data for comparison and does not require any physical modification but calibration which is enhanced by using the other observed and available data.

It is preferred to employ an environmental chamber on the vehicle which is maintained at a stable temperature and provides a clean environment.

A combined use of inertial navigation and electronic distance measuring equipment may be used to continuously provide latitude, longitude, and speed control data for the pilot. This total navigation package allows the airborne vehicle to be manually flown within a speed range of five knots and along a predetermined flight path to within five hundred feet.

If a helicopter is employed the rotor blades are precisely tracked and aligned for smoothness of flight.

A probe for measurement of static air pressure only and which is not subject to ram pressure may be provided to aid in measuring the elevation of the plane. The probe should be located so that only static air pressure is measured, and for a helicopter it may be on a retractable probe located in front of the helicopter, or a few feet above the helicopter blades at the center of rotation of the blades. The probe is in communication with the environmental chamber.

In order to determine the altitude of the airborne vehicle a combination of radar, or laser, and pressure sensitive measurments can be used to establish the altitude of the aircraft to within ten feet. Suitable radar equipment is available from Honeywell, Inc., Minneapolis, Minn. Suitable laser equipment is available from Spectra Physics, Inc., Mountain View, Calif.

Suitable equipment for measuring absolute pressure is available from Rosemount, Inc., Minneapolis, Minn. In order to obtain data having the required accuracy it is necessary to get a redundancy of solutions.

The data provides three separate calculations for each position. In order to get a position it takes at least two ranges and with three the redundancy of data enables calculations to be made that have the required precision, so that the positions are located with the requisite accuracy to give commercial meaning to the gravity and magnetic survey data, which then provides a useful map of the area of survey.

During operations relative measurements are made and recorded of the altitude to an accuracy of the order of 0.5 feet.

Two types of pressure altimeters are disclosed, and since it is important to achieve extreme accuracy of measurement, multiple altimeters may be used to provide a means to check each other and to measure acceleration.

One type of pressure altimeter is an absolute device that measures the pressure and changes that occur in the atmosphere. Ground based absolute altimeters are also used to record the changes at ground level, and all of these measurements are then combined to establish and record pressure surface changes in the survey area.

The second type of pressure altimeter comprises two bi-directional narrow range pressure transducers carried on the aircraft, which are temperature stabilized in the aircraft environmental chamber, and are used to measure and record minute changes in the aircraft altitude. Such transducers are available from Setra Systems, Inc., Natick, Mass. A static air pressure source of non-turbulent air is provided to these sensors through the described pressure probe.

In order to provide a record of the accumulated data, all data is recorded at a one second or other desired interval on magnetic tape. All the analog data channels are recorded at a sensitivity of the order of 0.0001 volts. Suitable equipment for this purpose comprises a digital system such as the Lancer Electronics Model 4570, available from Lancer Electronics Corp., Collegeville, Pa., interfaced to a Kennedy Model 9800 tape transport available from Kennedy Inc., Altadena, Calif.

The information is read after written on the tape and displayed on a paper tape reader. A digital volt meter is available to visually monitor any channel of data. One system that can be used for operating and controlling the navigation of the airborne vehicle is a line of sight electronic distance measuring system using multiple ground stations. One suitable type of system is the Motorola Miniranger, available from Government Electronics Division, Motorola, Inc., Socttsdale, Ariz.

Another system for controlling the navigation of the airborne vehicle is known as SERIES Satellite Emission Radio Interferometric Earth Surveying available from Jet Propulsion Laboratory, Pasadena, Calif. and which formed a part of Third Annual Nasa Program Review, Crustal Dynamics Project, Geodynamics Research, Jan. 26–29, 1981, Goddard Space Flight Center. An example of the system is shown in the MacDoran, U.S. Pat. No. 4,170,776. Additionally, the ionospheric calibration problem recognized in the patent has been successfully addressed by a new technique called Satellite L-band Ionospheric Calibration (SLIC) which has demonstrated the ability for a single SERIES station to derive the total electron collumnar content by cross correlation of the two broadcast Global Positioning System (GPS) channels. An important additional data-type is Doppler occurring at an effective wave length of 86 cms.

Another system which may be used for operating and controlling the navigation of the airborne vehicle is known as the NAVSTAR Global Positioning System, as described in detail in Microwave System News, November 1984, Volume 14, Number 12, at pages 54–59, 62, 65, 67, 68, 70, 75–78, and 83. The NAVSTAR system uses 17 satellites plus 3 spares to cover the globe with three, six unit orbits. The satellites rotate every 12 hours and appear once every 24 hours. The satellites are precisely mathematiclly positioned so that one desiring to obtain a position location can always receive four separate signals at one time for precise location. The four separate signals are longitude, latitude, elevation, and exact time.

After the area to be surveyed is determined and parameters are selected a grid pattern of equally spaced lines in two directions is selected to provide a multiple number of intersections that are data check points for all of the measurements to be made by the aircraft. These lines can provide calibration information, equipment verifications, and data validity certification, and each of these lines is to be flown with data recorded therealong as hereinafter described.

If it is desired to use the line of sight system then each ground station is located on a precise geodetic marker using the Navy transit satellite system in the translocation mode, with an excellent statistical sampling of good angle passes, which computes a position to less than 1 meter in latitude, longitude and elevation.

Each transponder, one of which is located at each of the ground stations is adjusted to measure a calibrated distance on a known range, before being installed at the ground station.

If desired the NAVSTAR system can also be used to precisely locate the ground transponders.

After all the ground stations are in action the airborne vehicle is flown across the centerpoint between two stations to check the base line distance. Several passes along each base line are made before the survey begins. These calibrations and measurements are made so that the computed position will be known to an accuracy of the order of a circle of three meters diameter.

After an area of survey has been selected, a plot of lines to be flown is made. A computer listing of the grid forming the beginning and ending points of the lines, and all of the intersection points of any two lines is made.

The preplotted lines are the flight paths intended to be flown by the aircraft. After the geology trends of the area of survey had been determined, which information may have been supplied by the customer, or available from other sources, and based on other survey criteria for the area, the direction, number and length of the preplotted lines which were intended as the flight path of the aircraft were determined and the appropriate information entered into the aircraft computer.

A selected elevation is chosen over a known altitude which is to be used for calibration and verification purposes. The selected elevation is not the known elevation of a reference lake or airfield but is the known reference altutude over the lake or airfield. Prior to commencement of flight over the area of survey the aircraft goes to the selected or reference altitude, which is measured using the known elevation of the lake or airfield and proceeds to the area of survey after calibrating the instruments at the reference altitude.

At the area of survey the aircraft goes to the selected level of flight at which the area of survey is to be flown, and the aircraft is flown along the preplotted flight path lines.

When the area of survey has been flown the aircraft returns to the selected or reference altitude, to check the readings of the instruments after flight, to validate the date due to possible changes in pressure surfaces which would cause changes in the instruments readings. Any noted changes are factored into the data in order to maintain the integrity of the data. If there were no checks made at the reference altitude or selected elevation than errors could be introduced into the data as a result of the pressure changes affecting the instrument readings.

During data collection at the area of survey, at least three unique ranges are measured every second to determine the aircraft's position. An onboard computer calculates the aircraft's position, and supplies the data to the navigator plot board and to a pilot display on the flight panel. This collected data is compared to a predetermined flight path that is located in the memory of a computer in the airborne vehicle, and the airborne vehicle is guided down the required path.

The use of the satellites as seen in FIG. 3 enables the airborne vehicle operator to precisely determine the elevation of the airborne vehicle due to the angular relationship between the vehicle and the satellites.

If desired, the NAVSTAR system can be used to provide longitude, latitude, elevation, and exact time of the airborne vehicle. This system enables the operator to go into an area which may be mountainous or have other undesirable features for transponder location, and to set up and operate without the use of the ground transponders.

In addition, less personnel and equipment are needed using the NAVSTAR system which does away with the need for support airborne vehicles and personnel to set up the ground transponders, thereby providing greater economy and more precision operation then is available from the ground transponder approach.

The satellite data may be received on board the airborne vehicle, and the radio signals from the satellites linked to an auto-pilot to automatically provide very precise control of the vehicle's flight path along the preplotted path, with an elevational accuracy of the order of six inches.

To assemble the desired magnetic data any well known magnetometer can be used such as the Barringer proton procession magnetometer available from No special modifications are required for the magnetometer, but it should be noted that the recorded data is considerably more accurate than obtained with other systems due to the high degree of achieved stabilization of the airborne vehicle.

For purposes of assembling the desired gravity information, a modified three axis stabilized platform gravity meter available from La Coste and Romberg, Inc., Austin, Tex., or from Bell Aerosystems, Inc., Buffalo, N.Y., is used. The gravity meter is modified so that the data is recorded with only 1.5 seconds of filtering. A further modification is made to provide a shorting switch, that zeros the output from the amplifiers, so that the gravity meter can be stabilized in a short period of time.

All parameters of the meter and its platform are recorded every one second on magnetic tape. The gravity meter output of the total acceleration measurement as modified is recorded with little or no filtering. The stabilization time of the meter is therefore very short, as the output is kept in null state electronically until the aircraft is in stable flight condition. The meter is then allowed to accumulate the total accelerations measured by the gravity meter.

When flying the survey in a helicopter, experience has shown (with respect to the reference elevation) that for a path of 400 kilometers, the helicopter will be within vertical range of ±4 meters and the vertical location of the helicopter is known within 4 to 6 centimeters.

All important outputs are monitored on strip chart recorders so that the details of a gravity meter survey operation can be observed and corrected when required. Among these outputs are the cross coupling corrections, i.e., inherent and imperfection types. These corrections are basically corrections to the meter for being slightly off level, and for the mechanical components of the meter flexing under acceleration. This is set forth in more detail in the La Coste publication previously referred to at pages 501 to 505.

The mode of operation will now be pointed out.

Prior to commencement of flight operations an area of survey is determined which is based on the needs, requirements, and funds of the customer which dictates the parameters of the survey.

The survey criteria would include what the customer is looking for, i.e. is the survey for oil, or for minerals, how large is the area of survey, is it to be conducted over level or mountainous terrain and what is the geologic information, if any, that has already been collected. In addition, the amount of funds available dictates the number of lines that can be flown over an area, the density of the lines and the speed of the aircraft. The location, flight speed and selected level of flight and other parameters are selected taking into consideration the survey criteria.

If the airborne vehicle is a helicopter then the blades of the helicopter are precisely tracked and aligned for smoothness of flight. All the sensors are ground calibrated after which the airborne vehicle takes off and goes to the flight altitude selected for the survey. A reference altitude from the radar or laser altimeter is preferably made over a known elevation such as a lake or airfield. The aircraft instruments are locked on the reference altitude.

In flight all data is monitored by analog strip chart recorders with common time events. The analog recordings from the gravity meter are of the raw beam movement, spring tension, average beam movement, cross or transverse acceleration, longitudinal acceleration, heading from the inertial position of the gravity meter, and are recorded on the tape.

Analog recordings from the altimeter sensors, provide a basis for measuring the absolute pressure reading, and the relative pressure movement, and are recorded on the tape.

The data from the altimeter sensors provides a basis to support the data from the other instruments, and provides with the data from the other instruments the absolute information required. In other words, the integrity of the altimeter sensor data is based on being able to cross check or compare it with the other observed data, which together provides data which is accurate enough to be useful for airborne gravity and magnetic surveying of an area.

Analog recordings are also received from the navigation system as to each range measurement, and are recorded on the tape for whichever navigation system is employed.

Additional data is also recorded on the tape and includes the line number, the time, the observed gravity, the digital radar measurement, the observed magnetics, the total correction, cross coupling, the average beam movement at different levels of filtering; five different cross couplings including cross acceleration squared, vertical acceleration squared, vertical cross coupling, longitudinal cross coupling and cross accelerations; east and north gyroscope outputs, the azimuth gyroscope, the inertial navigation heading, pressure altimeter output with additional filtering, the signal ground, and the simultaneous signals are digitized and sampled at a one second sampling interval and put onto the tape.

Before, during and after each flight, all information is printed on paper tape to provide assurance that data are being collected. Analog recorders continuously monitor all important signal parameters.

The fuel system feeds the aircraft power plant from the center tank, and transfers fuel into the tank from the other tanks as required and also to maintain a constant center of gravity of the aircraft.

During flight, the operator of the gravity meter is able to change the sensitivity of the data recorders in order to precisely monitor the system performance. In this manner, he is able to check the platform level and the beam position very accurately.

The beam is an internal component of the La Coste gravity meter. The beam acts as a lever between the mass in the gravity meter and the fulcrum point of the spring tension measuring screw. The zero length spring in the gravity meter is attached to the mass that is supported by the beam.

The beam position is an important measurement because the automatic nulling circuit of the gravity meter requires it to be near zero, or it will drive the spring tension away from the value necessary for the best readings. If this spring is driven away from null, the meter requires 10 to 30 minutes to fully stabilize for accurate readings to be recorded. The beginning of lines to be flown requires concentration and full coordination between the operator of the gravity meter, the navigator, and the pilot to prevent any elevation, course, or speed changes that would affect the beam position. In areas of steep gravity gradients or rough topography, the initial nulling of the gravity meter requires a skilled flight crew.

The onboard navigation computer and plotter provides a continuous monitor for the flight path of the airborne vehicle. Preplots of the proposed line spacings are made and fed into the navigational computer heretofore identified. After one of the lines of the preplot has been followed the airborne vehicle is returned to the start of the next line of the preplot, which is followed with data available and recorded as before.

The computer vectors the pilot to the beginning of the flight line and computes the ground speed. If the flight path begins to deviate from the preplotted line, then slight course changes to return the aircraft to the preplotted line are made by the pilot whether the vehicle is being flown manually or on auto-pilot.

If desired, the NAVSTAR Satellite System can be used to control the operation of the airborne vehicle, which can be accomplished by recording the altitude, longitude, elevation, and time, as such data is obtained from the NAVSTAR satellites, and the information fed into the onboard navigation computer.

The vehicle can be flown manually by the pilot as described above while using the NAVSTAR system to provide desired navigation data. If, however, it is desired to operate the vehicle by auto-pilot, the NAVSTAR satellite signals can be linked to the auto-pilot to control its operation, to insure that the aircraft flight path precisely follows the preplotted line, with course changes being automatically made by the auto-pilot, but which also requires monitoring of the flight path so that changes caused by external factors such as wind direction and speed can be made by the pilot as required.

At the end of the flight the airborne vehicle returns to the known reference altitude over the lake or airfield and the flight elevation is compared with the selected elevation before landing. Since the apparatus located on board the aircraft surveys and records both gravity and magnetic data, the data can be cross checked to further insure the accuracy of the gravity and magnetic data.

It will thus be seen that a method of airborne gravity and magnetic field surveying has been provided in accordance with the objects of the invention.

We claim:

1. A gravity surveying method employing an airborne vehicle having means for controlling the flight of said vehicle, said method comprising the steps of:

(a) maneuvering the airborne vehicle along a predetermined flight path, at a preselected level of flight, over an area of survey;

(b) stabilizing said vehicle during flight to minimize deviations from said preselected level of flight;

(c) measuring the vertical acceleration of a platform located within said airborne vehicle using a gravity meter mounted on said platform, and recording the measured vertical acceleration of said platform, at a predetermined sample rate, as the airborne vehicle follows said predetermined flight path;

(d) employing a satellite-based radio interferometric technique to obtain accurate indications of the level of flight of said airborne vehicle, and recording the indicated level of flight of said airborne vehicle, at a predetermined sample rate, as the airborne vehicle follows said predetermined flight path;

(e) generating, based on the recorded measurements of the vertical acceleration of the platform and the recorded indications of the level of flight of said airborne vehicle, information indicative of the gravitational characteristics of the area of survey.

2. The method recited in claim 1 further comprising the step of making preplotted lines of said area of survey over which said airborne vehicle is to be flown and generating said predetermined flight path in accordance with said preplotted lines.

3. The method recited in claim 1 wherein said step of generating information indicative of the gravitational characteristics of the area of survey comprises:

determining, from the recorded indications of the level of flight of said airborne vehicle, deviations of the airborne vehicle from said preselected level of flight;

adjusting the recorded measurements of the vertical acceleration of said platform to compensate for the deviations in the level of flight of said vehicle; and generating said information indicative of the gravitational characteristics of the area of survey based on the adjusted vertical acceleration measurements.

4. The method recited in claim 1 further comprising the steps of:

measuring, with an altimeter, the altitude of said airborne vehicle over the area of survey as the airborne vehicle follows said predetermined flight path in order to obtain information concerning the topographical characteristics of the area of survey; and recording the altimeter measurements at a predetermined sample rate, said recorded altimeter measurements being employed to enhance the accuracy of the generated information indicative of the gravitational characteristics of the area of survey.

5. The method recited in claim 4 wherein said altimeter comprises a radar-based altimeter.

6. The method recited in claim 1 further comprising the steps of:

(i) stabilizing said vehicle during flight to minimize horizontal deviations from said preselected flight path; and (ii) employing said satellite-based radio interferometric technique to obtain accurate indications of the latitudinal and longitudinal position of said airborne vehicle, and recording the indicated latitudinal and longitudinal position of said airborne vehicle, at predetermined intervals, as the airborne vehicle follows said predetermined flight path, the recorded latitudinal and longitudinal position indications being used to identify deviations from the predetermined flight path and to further enhance the accuracy of the generated information indicative of the gravitational characteristics of the area of survey.

7. The method recited in claim 1 herein said means for controlling the flight of said vehicle comprises an automatic flight control system, and wherein said step of stabilizing said vehicle during flight to minimize deviations from said preselected level of flight comprises operating said airborne vehicle under control of said automatic flight control system.

8. The method recited in claim 7 wherein said automatic flight control system controls the level of flight of said airborne vehicle in response to input from a pressure probe mounted on said airborne vehicle, and wherein said stabilizing step further comprises the step of mounting the pressure probe on said airborne vehicle in a location that minimizes the effects of ram pressure on the pressure probe.

9. The method recited in claim 7 further comprising the step of calibrating said automatic flight control system so as to increase the response sensitivity and response time of said system to small changes in the level of flight of said airborne vehicle.

10. The method recited in claim 1 further comprising the steps of locating said platform and said gravity meter at a center of gravity of said airborne vehicle.

11. An airborne gravity surveying method for generating information indicative of the gravitational characteristics of an area of survey, said method employing an airborne vehicle having means for controlling the flight of said vehicle, said method comprising the steps of:

(a) maneuvering the airborne vehicle along a predetermined flight path, at a preselected level of flight, over the area of survey;

(b) stabilizing said vehicle during flight to minimize deviations from said preselected level of flight;

(c) measuring the vertical acceleration of a platform located within said airborne vehicle using a gravity meter mounted on said platform, and recording the measured vertical acceleration of said platform, at a predetermined sample rate, as the airborne vehicle follows said predetermined flight path;

(d) employing a satellite-based radio interferometric technique to obtain accurate indications of the level of flight of said airborne vehicle, and recording the indicated level of flight of said airborne vehicle, at a predetermined sample rate, as the airborne vehicle follows said predetermined flight path, said information indicative of the gravitational characteristics of the area of survey being based on the recorded measurements of the vertical acceleration of the platform and the recorded indications of the level of flight of said airborne vehicle.

12. The method recited in claim 11 further comprising the step of making preplotted lines of said area of survey over which said airborne vehicle is to be flown and generating said predetermined flight path in accordance with said preplotted lines.

13. The method recited in claim 11 wherein said information indicative of the gravitational characteristics of the area of survey is generated by:

determining, from the recorded indications of the level of flight of said airborne vehicle, deviations of the airborne vehicle from said preselected level of flight; and adjusting the recorded measurements of the vertical acceleration of said platform to compensate for the deviations in the level of flight of said vehicle.

14. The method recited in claim 11 further comprising the steps of:

measuring, with an altimeter, the altitude of said airborne vehicle over the area of survey as the airborne vehicle follows said predetermined flight path in order to obtain information concerning the topographical characteristics of the area of survey; and recording the altimeter measurements at a predetermined sample rate, said recorded altimeter measurements being employed to enhance the accuracy of said information indicative of the gravitational characteristics of the area of survey.

15. The method recited in claim 14 wherein said altimeter comprises a radar-based altimeter.

16. The method recited in claim 11 further comprising the steps of:

(i) stabilizing said vehicle during flight to minimize horizontal deviations from said preselected flight path; and (ii) employing said satellite-based radio interferometric technique to obtain accurate indications of the latitudinal and longitudinal position of said airborne vehicle, and recording the indicated latitudinal and longitudinal position of said airborne vehicle, at predetermined intervals, as the airborne vehicle follows said predetermined flight path, the recorded latitudinal and longitudinal position indications being used to identify deviations from the predetermined flight path and to further enhance the accuracy of said information indicative of the gravitational characteristics of the area of survey.

17. The method recited in claim 11 wherein said means for controlling the flight of said vehicle comprises an automatic flight control system, and wherein said step of stabilizing said vehicle during flight to minimize deviations from said preselected level of flight comprises operating said airborne vehicle under control of said automatic flight control system.

18. The method recited in claim 17 wherein said automatic flight control system controls the level of flight of said airborne vehicle in response to input from a pressure probe mounted on said airborne vehicle, and wherein said stabilizing step further comprises the step of mounting the pressure probe on said airborne vehicle in a location that minimizes the effects of ram pressure on the pressure probe.

19. The method recited in claim 17 further comprising the step of calibrating said automatic flight control system so as to increase the response sensitivity and response time of said system to small changes in the level of flight of said airborne vehicle.

20. The method recited in claim 11 further comprising the steps of locating said platform and said gravity meter at a center of gravity of said airborne vehicle.

21. A gravity survey comprising information indicative of the gravitational characteristics of an area of survey, said gravity survey being generated in accordance with the following steps:

(a) providing an airborne vehicle having means for controlling the flight of said vehicle;

(b) maneuvering the airborne vehicle along a predetermined flight path, at a preselected level of flight, over the area of survey;

(c) stabilizing said vehicle during flight to minimize deviations from said preselected level of flight;

(d) measuring the vertical acceleration of a platform located within said airborne vehicle using a gravity meter mounted on said platform, and recording the measured vertical acceleration of said platform, at a predetermined sample rate, as the airborne vehicle follows said predetermined flight path;

(e) employing a satellite-based radio interferometric technique to obtain accurate indications of the level of flight of said airborne vehicle, and recording the indicated level of flight of said airborne vehicle, at a predetermined sample rate, as the airborne vehicle follows said predetermined flight path, said information indicative of the gravitational characteristics the area of survey being based on the recorded measurements of the vertical acceleration of said platform and the recorded indications of the level of flight of said airborne vehicle.

22. The gravity survey recited in claim 21 wherein the steps of generating the gravity survey include making preplotted lines of said area of survey over which said airborne vehicle is to be flown and generating said predetermined flight path in accordance with said preplotted lines.

23. The gravity survey recited in claim 21 wherein said information indicative of the gravitational characteristics of the area of survey is generated by:

determining, from the recorded indications of the level of flight of said airborne vehicle, deviations of the airborne vehicle from said preselected level of flight as the airborne vehicle flew over the area of survey; and adjusting the recorded measurements of the vertical acceleration of said platform to compensate for the deviations in the level of flight of said vehicle.

24. The gravity survey recited in claim 21 wherein the steps of generating the gravity survey further comprise the steps of:

measuring, with an altimeter, the altitude of said airborne vehicle over the area of survey as the airborne vehicle follows said predetermined flight path in order to obtain information concerning the topographical characteristics of the area of survey; and recording the altimeter measurements at a predetermined sample rate, said recorded altimeter measurements being employed to enhance the accuracy of said information indicative of the gravitational characteristics of the area of survey.

25. The gravity survey recited in claim 24 wherein the altimeter used to perform said altitude measuring step comprises a radar-based altimeter.

26. The gravity survey recited in claim 21 wherein the steps of generating the gravity survey further comprise:

stabilizing said vehicle during flight to minimize horizontal deviations from said preselected flight path; and employing said satellite-based radio interferometric technique to obtain accurate indications of the latitudinal and longitudinal position of said airborne vehicle, and recording the indicated latitudinal and longitudinal position of said airborne vehicle, at predetermined intervals, as the airborne vehicle follows said predetermined flight path, the recorded latitudinal and longitudinal position indications being used to identify deviations from the predetermined flight path and to further enhance the accuracy of said information indicative of the gravitational characteristics of the area of survey.

27. The gravity survey recited in claim 21 wherein said means for controlling the flight of said airborne vehicle comprises an automatic flight control system, and wherein the accuracy of the information indicative of the gravitational characteristics of the area of survey is enhanced by operating said airborne vehicle under control of said automatic flight control system.

28. The gravity survey recited in claim 27 wherein said automatic flight control system controls the level of flight of said airborne vehicle in response to input from a pressure probe mounted on said airborne vehicle, and wherein the accuracy of the information indicative of the gravitational characteristics of the area of survey is enhanced by mounting the pressure probe on said airborne vehicle in a location that minimizes the effects of ram pressure on the pressure probe.

29. The gravity survey recited in claim 27 wherein the accuracy of the information indicative of the gravitational characteristics of the area of survey is enhanced by calibrating said automatic flight control system so as to increase the response sensitivity and response time of said system to small changes in the level of flight of said airborne vehicle.

30. The gravity survey recited in claim 21 wherein the accuracy of the information indicative of the gravitational characteristics of the area of survey is enhanced by locating said platform and said gravity meter at a center of gravity of said airborne vehicle.

* * * * *